United States Patent
Ito et al.

(10) Patent No.: US 9,646,734 B2
(45) Date of Patent: *May 9, 2017

(54) POSITIVE ELECTRODE ACTIVE MATERIAL, POSITIVE ELECTRODE FOR ELECTRICAL DEVICE, AND ELECTRICAL DEVICE

(71) Applicant: NISSAN MOTOR CO., LTD., Yokohama-shi, Kanagawa (JP)

(72) Inventors: Atsushi Ito, Ebina (JP); Shinji Yamamoto, Yokosuka (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/381,399

(22) PCT Filed: Mar. 6, 2013

(86) PCT No.: PCT/JP2013/056153
§ 371 (c)(1),
(2) Date: Aug. 27, 2014

(87) PCT Pub. No.: WO2013/133324
PCT Pub. Date: Sep. 12, 2013

(65) Prior Publication Data
US 2015/0132652 A1    May 14, 2015

(30) Foreign Application Priority Data
Mar. 7, 2012    (JP) ................................. 2012-050872

(51) Int. Cl.
*H01B 1/08*    (2006.01)
*C01G 45/00*    (2006.01)
(Continued)

(52) U.S. Cl.
CPC ............. *H01B 1/08* (2013.01); *C01G 45/006* (2013.01); *C01G 45/1221* (2013.01);
(Continued)

(58) Field of Classification Search
CPC ...... H01M 4/364; H01M 4/505; H01M 4/525; H01M 4/131; H01B 1/08; C01G 45/006;
(Continued)

(56) References Cited

U.S. PATENT DOCUMENTS 6,168,887 B1 *    1/2001    Dahn .................... H01M 4/505
                                                                429/231.1
7,368,071 B2      5/2008    Dahn et al.
(Continued)

FOREIGN PATENT DOCUMENTS

CN    101080830 A    11/2007
JP    2002-124258 A    4/2002
(Continued)

OTHER PUBLICATIONS

Zhonghua et al. "Layered cathode material Li[NixLi1/3-2xMn2/3-x/3]O2 for lithium-ion batteries." Electrochemical and Solid-State Letters. 4(11). 2001. A191-A194. Published Nov. 13, 2001.*
(Continued)

*Primary Examiner* — Mark Kopec
*Assistant Examiner* — Matthew R Diaz
(74) *Attorney, Agent, or Firm* — Foley & Lardner LLP

(57) ABSTRACT

[Summary] A positive electrode active material is provided to contain: a solid solution lithium-containing transition metal oxide (A) represented by $Li_{1.5}[Ni_aCo_bMn_c[Li]_d]O_3$ (where a, b, c and d satisfy the relations of $a+b+c+d=1.5$, $0.1<d\leq0.4$, $1.1\leq a+b+c<1.4$, $0.2\leq a\leq0.7$ and $0<b/a<1$); and a lithium-containing transition metal oxide (B) represented by $LiM_xMn_{2-x}O_4$ (where M represents Cr or Al, and x satisfies the relation of $0\leq x<2$).

11 Claims, 2 Drawing Sheets

(51) Int. Cl.
    *C01G 45/12*     (2006.01)
    *C01G 51/00*     (2006.01)
    *C01G 53/00*     (2006.01)
    *H01M 4/36*     (2006.01)
    *H01M 4/505*     (2010.01)
    *H01M 4/525*     (2010.01)
    *H01M 4/131*     (2010.01)
    *H01M 10/0525*     (2010.01)

(52) U.S. Cl.
    CPC ..... *C01G 45/1235* (2013.01); *C01G 45/1257* (2013.01); *C01G 51/006* (2013.01); *C01G 51/56* (2013.01); *C01G 53/006* (2013.01); *C01G 53/56* (2013.01); *H01M 4/131* (2013.01); *H01M 4/364* (2013.01); *H01M 4/505* (2013.01); *H01M 4/525* (2013.01); *H01M 10/0525* (2013.01); *C01P 2004/61* (2013.01); *C01P 2004/82* (2013.01); *C01P 2006/12* (2013.01); *H01M 2220/20* (2013.01); *Y02T 10/7011* (2013.01)

(58) Field of Classification Search
    CPC ............ C01G 45/1221; C01G 45/1235; C01G 45/125; C01G 45/1257; C01G 51/006; C01G 51/56; C01G 53/006; C01G 53/56
    See application file for complete search history.

(56) References Cited

U.S. PATENT DOCUMENTS

| | | | |
|---|---|---|---|
| 7,476,467 | B2 | 1/2009 | Park et al. |
| 7,935,270 | B2 * | 5/2011 | Park ...................... H01M 4/131 252/182.1 |
| 7,955,734 | B2 | 6/2011 | Shimizu et al. |
| 8,227,113 | B2 | 7/2012 | Shimizu et al. |
| 8,530,092 | B2 | 9/2013 | Shimizu et al. |
| 8,557,440 | B2 | 10/2013 | Yu et al. |
| 2006/0051671 | A1 | 3/2006 | Thackeray et al. |
| 2006/0051673 | A1 | 3/2006 | Johnson et al. |
| 2006/0099508 | A1 * | 5/2006 | Thackeray ............ H01M 4/131 429/231.1 |
| 2006/0159994 | A1 | 7/2006 | Dahn et al. |
| 2007/0015055 | A1 * | 1/2007 | Lee ...................... H01M 4/505 429/231.1 |
| 2007/0099087 | A1 * | 5/2007 | Mihara .................. C01B 25/45 429/231.95 |
| 2008/0085452 | A1 * | 4/2008 | Park ...................... H01M 4/131 429/220 |
| 2009/0123842 | A1 | 5/2009 | Thackeray et al. |
| 2010/0143784 | A1 | 6/2010 | Johnson et al. |
| 2011/0212366 | A1 | 9/2011 | Shimizu et al. |
| 2011/0244324 | A1 * | 10/2011 | Jang ...................... H01M 4/131 429/211 |
| 2011/0311869 | A1 | 12/2011 | Oh et al. |
| 2014/0131633 | A1 | 5/2014 | Ito et al. |

FOREIGN PATENT DOCUMENTS

| | | |
|---|---|---|
| JP | 2004-538610 A | 12/2004 |
| JP | 2005-340057 A | 12/2005 |
| JP | 2007-242581 A | 9/2007 |
| JP | 2008-511960 A | 4/2008 |
| JP | 2011-096626 A | 5/2011 |
| JP | 2011-233234 A | 11/2011 |
| KR | 10-20060044953 | 5/2006 |
| WO | WO 2009/131700 A2 | 10/2009 |

OTHER PUBLICATIONS

Thackeray et al., Advances in Manganese-oxide 'Composite' Electrodes for Lithium-Ion Batteries, Vo. 15, Journal of Materials Chemistry, Mar. 2005, pp. 2257-2267.
Park et al., Lithium—Manganese—Nickel—Oxide Electrodes with Integrated Layered-Spinel Structures for Lithium Batteries, vol. 9, Electrochemistry communications, 2007, pp. 262-268.
Extended European Search Report, Feb. 19, 2015, 9 pages.
"Layered Cathode Materials $Li[Ni_xLi_{(1/3-2x/3)}Mn_{(2/3-x/3)}]O_2$ for Lithium-Ion Batteries". Electrochemical and Solid-State Letters 4(11) pp. A191-A194(2001).
Li J et al.: "Synthesis and electrochemical performance of the high voltage cathode material Li[LiMnCo]O with improved rate capability", Journal of Power Sources, Elsevier SA, CH, vol. 196, No. 10, Jan. 3, 2011 (Jan. 3, 2011), pp. 4821-4825, XP028185665.
Communication with Extended European Search Report dated Aug. 12, 2014, from the corresponding European Patent Application No. 12806982.0.
USPTO Office Action, U.S. Appl. No. 14/130,643, filed Oct. 1, 2015, 28 pages.
USPTO Office Action, U.S. Appl. No. 14/130,643, filed Mar. 14, 2016, 19 pages.

\* cited by examiner

US 9,646,734 B2

POSITIVE ELECTRODE ACTIVE MATERIAL, POSITIVE ELECTRODE FOR ELECTRICAL DEVICE, AND ELECTRICAL DEVICE

TECHNICAL FIELD

The present invention relates to a positive electrode active material, a positive electrode for an electrical device, and an electrical device.

More specifically, the electrical device according to the present invention is suitably used as an electrical device for a vehicle such as an electric vehicle, a fuel cell vehicle and a hybrid electric vehicle. Additionally, in normal cases, the positive electrode active material according to the present invention is suitably used as a positive electrode active material for a lithium ion secondary battery or a lithium ion capacitor serving as the electrical device.

BACKGROUND OF THE INVENTION

To cope with the problems caused by air pollution and global warming, reducing the carbon dioxide emission is desperately needed in recent days. The automobile industry focuses on introduction of an electric vehicle (EV) or a hybrid electric vehicle (HEV) to reduce the carbon dioxide emission. In this connection, an electrical device like a secondary battery for driving a motor, which is a key element for commercialization of such vehicles, is actively developed.

As the secondary battery for driving a motor, a lithium ion secondary battery having a high theoretical energy has been getting an attention and has been actively developed in these days. The lithium ion secondary battery generally has a constitution where a positive electrode formed by applying a slurry for a positive electrode containing a positive electrode active material to the surface of a collector, a negative electrode formed by applying a slurry for a negative electrode containing a negative electrode active material to the surface of the collector, and an electrolyte disposed between the positive and negative electrodes are housed in a battery casing.

For the improvements of capacity characteristics and output characteristics of the lithium ion secondary battery, the choice of each active material is critically important.

Conventionally, there has been proposed a cathode composition for a lithium ion battery, represented by a formula (a) $Li_y[M^1_{(1-b)}Mn_b]O_2$ or (b) $Li_x[M^1_{(1-b)}Mn_b]O_{1.5+c}$ (In the formula, $0 \le y < 1$, $0 < b < 1$ and $0 < c < 0.5$ and $M^1$ represents one or more kinds of metal elements; however, in the case of (a), $M^1$ represents a metal element other than chromium), the composition being in a form of a single phase having an O3 crystal structure that does not undergo a phase transformation to a spinel crystal structure when incorporated in a lithium ion battery and cycled for 100 full charge-discharge cycles at 30° C. and a final capacity of 130 mAh/g using a discharge current of 30 mA/g (see Patent Document 1).

However, the present inventors studied it and found it bearing a problem that, even in a lithium ion battery using the cathode composition for a lithium ion battery discussed in Patent Document 1, the discharge capacity, the discharge operating voltage and the initial rate characteristic are not enough.

The present invention is provided in view of the problems that the conventional technique has, the object of which is to provide a positive electrode active material, a positive electrode for an electrical device, and an electrical device, all of which make it possible to achieve excellent discharge operating voltage and initial rate characteristic while maintaining a high discharge capacity.

REFERENCES ABOUT PRIOR ART

Patent Documents

Patent Document 1: Japanese Patent Application Publication No. 2004-538610

SUMMARY OF THE INVENTION

The present inventors eagerly repeated studies for carrying out the above object. As a result, they found that the above object can become feasible by giving a constitution containing a solid solution lithium-containing transition metal oxide (A) and a lithium-containing transition metal oxide (B) represented by specified compositional formulas, thereby reaching the completion of the present invention.

More specifically, the present invention is provided according to the above findings, and a positive electrode active material according to the present invention is a positive electrode active material containing a solid solution lithium-containing transition metal oxide (A) and a lithium-containing transition metal oxide (B).

The solid solution lithium-containing transition metal oxide (A) contained in the positive electrode active material of the present invention is represented by a compositional formula (1)

$$Li_{1.5}[Ni_aCo_bMn_c[Li]_d]O_3 \qquad (1)$$

(In the formula (1), Li is lithium, Ni is nickel, Co is cobalt, Mn is manganese and O represents oxygen while a, b, c and d satisfy the relations of $0.2 \le a \le 0.7$, $0 < b < 0.7$, $0 < c < 1.2$, $0.1 < d \le 0.4$, $a+b+c+d=1.5$, $1.1 \le a+b+c < 1.4$, and $0 < b/a < 1$.).

Meanwhile, the lithium-containing transition metal oxide (B) contained in the positive electrode active material of the present invention is represented by a compositional formula (2)

$$LiM_xMn_{2-x}O_4 \qquad (2)$$

(In the formula (2), Li is lithium, Mn is manganese, O is oxygen, M represents Cr or Al, and x satisfies the relation of $0 \le x < 2$.).

Moreover, a positive electrode for an electrical device of the present invention contains the positive electrode active material as discussed in the above invention.

Furthermore, an electrical device of the present invention contains the above-mentioned positive electrode for an electrical device.

According to the present invention, it becomes possible to provide a positive electrode active material, a positive electrode for an electrical device, and an electrical device, all of which make it possible to achieve excellent discharge operating voltage and initial rate characteristic while maintaining a high discharge capacity.

MODE(S) FOR CARRYING OUT THE INVENTION

Figure 1:
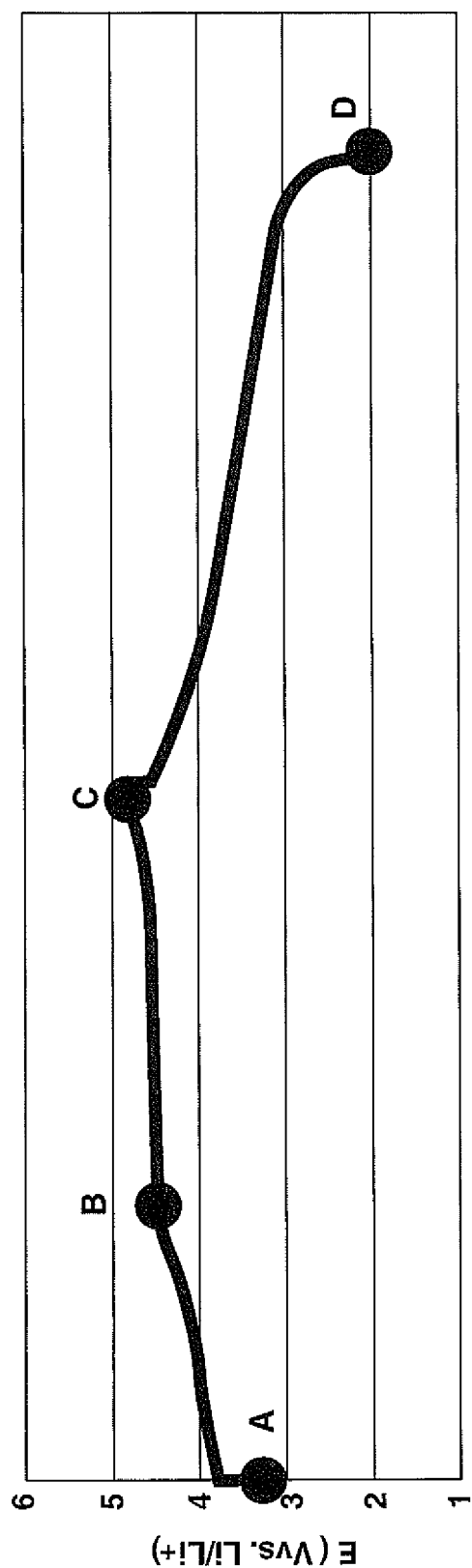
FIG. 1 A graph for explaining the definition of a spinel structure change ratio.

Hereinafter, a positive electrode active material, a positive electrode for an electrical device and an electrical device will be discussed in detail. Furthermore, the positive electrode active material of the present invention is suitably used as a positive electrode active material for a lithium ion secondary battery that serves as an electrical device, for example. Therefore, explanations of a positive electrode for an electrical device and an electrical device relating to a first embodiment of the present invention will be made by citing a positive electrode for a lithium ion secondary battery and a lithium ion secondary battery as respective examples.

First of all, a positive electrode active material according to a first embodiment of the present invention will specifically be discussed.

A positive electrode active material of the present embodiment is a positive electrode active material containing a solid solution lithium-containing transition metal oxide (A) and a lithium-containing transition metal oxide (B).

The solid solution lithium-containing transition metal oxide (A) contained in the positive electrode active material of the present embodiment is represented by a compositional formula (1).

$$Li_{1.5}[Ni_aCo_bMn_c[Li]_d]O_3 \qquad (1)$$

(In the formula (1), Li is lithium, Ni is nickel, Co is cobalt, Mn is manganese and 0 represents oxygen while a, b, c and d satisfy the relations of 0.2≤a≤0.7, 0<b<0.7, 0<c<1.2, 0.1<d≤0.4, a+b+c+d=1.5, 1.1≤a+b+c<1.4, and 0<b/a<1.)

Additionally, the solid solution lithium-containing transition metal oxide (A) contained in the positive electrode active material of the present embodiment has: a layered structure portion that changes into a spinel structure by performing charge or charge-discharge within an electric potential range of not less than 4.3V and not more than 4.8V; and a layered structure portion that does not change.

Furthermore, the solid solution lithium-containing transition metal oxide (A) contained in the positive electrode active material of the present embodiment has a spinel structure change ratio of not smaller than 0.25 and smaller than 1.0 when the spinel structure change ratio in the case where all of $Li_2MnO_3$ in the changeable layered structure portion change into $LiMn_2O_4$ (the spinel structure) is one.

Meanwhile, the lithium-containing transition metal oxide (B) contained in the positive electrode active material of the present embodiment is represented by the compositional formula (2) and provided to have the spinel structure.

$$LiM_xMn_{2-x}O_4 \qquad (2)$$

(In the formula (2), Li is lithium, Mn is manganese, O is oxygen, M represents Cr or Al, and x satisfies the relation of 0≤x<2.)

Such a positive electrode active material can achieve excellent discharge operating voltage and initial rate characteristics when used in a lithium ion secondary battery, while maintaining a high discharge capacity. Therefore, it is suitably used in a positive electrode for a lithium ion secondary battery and in a lithium ion secondary battery. Moreover, such a positive electrode active material exhibits a high capacity maintenance ratio within an electric potential range of not less than 3.0V and not more than 4.5V in particular. As a result, it can be suitably used as a lithium ion secondary battery for use in a drive power supply or an auxiliary power supply of a vehicle. In addition to this, it is fully applicable to lithium ion secondary batteries for home use or for portable devices.

Incidentally, the term "charge" refers to an operation for increasing the potential difference between the electrodes continuously or stepwise. Meanwhile, the term "charge-discharge" refers to an operation for decreasing the potential difference between the electrodes continuously or stepwise after the operation for increasing the potential difference between the electrodes continuously or stepwise, or an operation for appropriately repeating these operations.

In the compositional formula (1) of the solid solution lithium-containing transition metal oxide (A), if a, b, c and d do not satisfy the relations of 0.2≤a≤0.7, 0<b<0.7, 0<c<1.2, 0.1<d≤0.4, a+b+c+d=1.5, 1.1≤a+b+c<1.4, and 0<b/a<1, the structure in the solid solution lithium-containing transition metal oxide (A) does not become stable. Furthermore, if the solid solution lithium-containing transition metal oxide (A) has neither the layered structure portion changeable into the spinel structure by performing charge or charge-discharge within an electric potential range of not less than 4.3V and not more than 4.8V nor the non-changeable layered structure portion, high discharge capacity and capacity maintenance ratio are not obtained. More specifically, it is important to expose the solid solution lithium-containing transition metal oxide (A) to a potential plateau section of around 4.5V or more one or more times.

Furthermore, the spinel structure change ratio in the solid solution lithium-containing transition metal oxide (A) never reaches 1.0. If it is smaller than 0.25, none of high discharge capacity, high capacity maintenance ratio and excellent initial rate characteristics can be accomplished.

By the way, the present invention defines the term "a spinel structure change ratio" as a ratio of $Li_2MnO_3$ (the layered structure in the solid solution lithium-containing transition metal oxide (A)) being changed into $LiMn_2O_4$ (the spinel structure in the same) by performing charge or charge-discharge within a certain electric potential range, and defines the spinel structure change ratio obtained in the case where all of $Li_2MnO_3$ (the layered structure in the solid solution lithium-containing transition metal oxide (A) change into $LiMn_2O_4$ (the spinel structure) as one. More specifically, the ratio is defined by the following equation.

[Spinel structure change ratio (K)] =

$$\frac{\begin{pmatrix} \text{Actual capacity of} \\ \text{plateau region} \end{pmatrix}}{\begin{pmatrix} \text{Theoretical capacity } (V_S) \\ \text{derived from } Li_2MnO_3 \\ \text{in solid solution} \end{pmatrix} \times \begin{pmatrix} \text{Composition ratio} \\ (x) \text{ of } Li_2MnO_3 \\ \text{in solid solution} \end{pmatrix}}$$

The definition of "the spinel structure change ratio" will be discussed by citing as an example a case as shown in FIG. 1 in which a battery assembled using a positive electrode containing the solid solution lithium-containing transition metal oxide (A) as the positive electrode active material passes through an initial state (A) of before starting charge, a charged state (B) of having been charged to 4.5V, a plateau region, an overcharged state (C) of having been charged to 4.8V, and a discharged state (D) which is discharged to 2.0V. The "actual capacity of the plateau region" in the above equation can be obtained by measuring the actual capacity of the plateau region (more specifically, a region from 4.5V to 4.8V (the actual capacity $V_{BC}$ within a region BC of from the charged state (B) to the overcharged state (C); i.e. the real capacity of the plateau region), the region resulting from the change of the crystal structure) in FIG. 1.

Further, in practice, in the solid solution lithium-containing transition metal oxide (A) represented by the compositional formula (1), the actual capacity $V_{AB}$ within a region AB of from the initial state (A) to the charged state (B) that has been charged to 4.5V corresponds to the composition (y) and the theoretical capacity ($V_L$) of LiMO$_2$ serving as the layered structure portion while the actual capacity $V_{BC}$ within a region BC of from the charged state (B) that has been charged to 4.5V to the overcharged state (C) that has been charged to 4.8V corresponds to the composition ratio (x) and the theoretical capacity (Vs) of Li$_2$MnO$_3$ serving as the spinel structure portion; hence an actual capacity ($V_T$) measured from the initial state (A) up to a certain plateau region can be defined as $V_T = V_{AB} + V_{BC}$ where $V_{AB=y}(V_L)$ and $V_{BC=x}(V_S)$K, so that it is also possible to calculate the spinel structure change ratio by using the following equation (where M represents at least one kind selected from the group consisting of nickel (Ni), cobalt (Co) and manganese (Mn)).

$$\left[\begin{array}{c}\text{Spinel structure}\\ \text{change ratio }(K)\end{array}\right] = \frac{\left(\begin{array}{c}\text{Actual capacity }(V_T)\\ \text{measured up to}\\ \text{plateau region}\end{array}\right) - \left(\begin{array}{c}\text{Theoretical capacity}\\ (V_L)\text{ derived from}\\ \text{LiMO}_2\text{ in solid}\\ \text{solution}\end{array}\right) \times \left(\begin{array}{c}\text{Composition ratio}\\ (y)\text{ of LiMO}_2\text{ in}\\ \text{solid solution}\end{array}\right)}{\left(\begin{array}{c}\text{Theoretical capacity }(V_S)\\ \text{derived from Li}_2\text{MnO}_3\\ \text{in solid solution}\end{array}\right) \times \left(\begin{array}{c}\text{Composition ratio }(x)\\ \text{of Li}_2\text{MnO}_3\text{ in}\\ \text{solid solution}\end{array}\right)}$$

In addition, "the composition ratio of Li$_2$MnO$_3$ in the solid solution" can be calculated from the compositional formula of the solid solution lithium-containing transition metal oxide (A). The presence or absence of the layered structure portion and the spinel structure portion in the solid solution lithium-containing transition metal oxide (A) can be determined by X-ray diffraction analysis (XRD) and by the presence of specific peaks in the layered structure and the spinel structure, and the ratio thereof can be determined from the measurement and calculation of the capacity as described above.

Moreover, in the compositional formula (1) of the solid solution lithium-containing transition metal oxide (A) contained in the positive electrode active material of the present embodiment, it is preferable that a, b, c and d satisfy the relations of $0.25<a<0.44$, $0<b<0.44$, $0.37<c<1.1$, $0.15 \leq d \leq 0.25$, $a+b+c+d=1.5$, $1.25 \leq a+b+c \leq 1.35$, and $0<b/a<1$ and that the spinel structure change ratio is not smaller than 0.5% and smaller than 0.9.

A positive electrode active material containing the thus obtained solid solution lithium-containing transition metal oxide (A) can achieve excellent discharge operating voltage and initial rate characteristics while maintaining a higher discharge capacity.

Additionally, the solid solution lithium-containing transition metal oxide (A) contained in the positive electrode active material of the present embodiment preferably has a BET specific surface area of not smaller than 0.8 m$^2$/g and not larger than 10.0 m$^2$/g, a 50% passing particle diameter (D50) of not more than 20 μm, and a primary particle. diameter of not smaller than 30 nm and not larger than 200 nm.

Within the above-mentioned range, it becomes possible to achieve excellent discharge operating voltage and initial rate characteristics while maintaining high discharge capacity, capacity maintenance ratio and initial charge-discharge efficiency. For example, in the case where the BET specific surface area is smaller than 0.8 m$^2$/g, the diffusion of lithium ions from the bulk of the crystal structure is so lowered that a high initial charge-discharge efficiency and excellent initial rate characteristics are sometimes not achieved. Meanwhile, in the case where the BET specific surface area is larger than 10.0 m$^2$/g and the 50% passing particle diameter exceeds 20 μm, the capacity maintenance ratio is sometimes lowered. Furthermore, if the primary particle diameter is out of the above range, a high discharge capacity may sometimes not be obtained.

Then, a method for producing the solid solution lithium-containing transition metal oxide (A) contained in the positive electrode active material according to the first embodiment of the present invention will be discussed in detail by citing some examples.

As an example of a method of producing a precursor of the solid solution lithium-containing transition metal oxide (A), it is possible to cite a production method that employs carbonate method (composite carbonate process). First, in use of sulfates, nitrates or the like of nickel (Ni), cobalt (Co) and manganese (Mn) as starting materials, predetermined amounts are weighed to prepare a mixed solution thereof. Then, aqueous ammonia is added dropwise to the mixed solution until pH 7 and thereafter an aqueous solution of sodium carbonate (Na$_2$CO$_3$) is added dropwise thereto, thereby precipitating a composite carbonate of Ni—Co—Mn (While dropping the Na$_2$CO$_3$ aqueous solution, the mixed solution is kept at pH 7 with ammonia water), followed by suction filtration, rinsing with water, drying and provisional calcination. Drying may be performed in the air under a drying condition of 100 to 150° C. for about 2 to 10 hours (for example, at 120° C. for 5 hours) but it is not limited to the above-mentioned range. Provisional calcination may he performed in the air under a provisional calcination condition of 360 to 600° C. for 3 to 10 hours (for example, at 500° C. for 5 hours) but it is not limited to the above-mentioned range. Furthermore, a slightly excessive amount of lithium hydroxide (LiOH.H$_2$O) was added to a product that had undergone provisional calcination, and mixed. Thereafter, a main calcination is conducted thereby obtaining a precursor of the solid solution lithium-containing transition metal oxide (A). The precursor is preferably subjected to rapid cooling after the main calcination by using liquid nitrogen because it is preferable to perform quenching after the main calcination by using liquid nitrogen and the like for ensuring the reactivity and cycle stability. For example, the main calcination may be, carried out in the air at a calcination temperature of 700 to 1000° C. (e.g. 800 to 900° C.) for about 3 to 20 hours (e.g. 12 hours).

The solid solution lithium-containing transition metal oxide (A) may be obtained by conducting an oxidation treatment on the precursor. It is possible to cite oxidation treatments such as (1) charge or charge-discharge within a certain electric potential range, more specifically, charge or charge-discharge from a low potential region not causing the first significant change in the crystal structure of the solid solution lithium-containing transition metal oxide, (2) oxidation by using an oxidizing agent (e.g. halogen such as bromine and chlorine) corresponding to charge, and (3) oxidation by using a redox mediator.

For a method of the oxidation treatment (1) which is a relatively simple and convenience method among the above-mentioned oxidation treatments (1) to (3), a charge or charge-discharge performed in the state of having constructed a battery or in the configuration of an electrode or equivalent electrodes in such a manner as not to exceed the maximal predetermined potential is effective (i.e. a treatment prior to charge-discharge, in which electric potential is regulated). With this, high discharge capacity and capacity maintenance ratio ay be achieved. Therefore, a positive electrode for a lithium ion secondary battery and a lithium ion secondary battery are suitably used.

In a method for the treatment prior to charge-discharge where electric potential is regulated, it is preferable to perform 1 to 30 cycles of charge-discharge under the conditions where the maximal electric potential within a predetermined range with respect to lithium metal counter electrode (the upper limit potential in charge-discharge, converted into lithium metal or lithium metal) is not less than 4.3V and not more than 4.8V. It is more preferable to perform 1 to 30 cycles of charge-discharge under the conditions of not less than 4.4V and not more than 4.6V. By carrying out the oxidation treatment by charge-discharge within the above-mentioned range, it is possible to achieve high discharge capacity and capacity maintenance ratio. Particularly in the case of conducting charge or charge-discharge with the maximal electric potential of about 4.8V in order to achieve a high capacity after the above-mentioned oxidation treatment (the treatment prior to charge-discharge where electric potential is regulated), it becomes possible to effectively keep a great capacity maintenance ratio. In this case, the upper limit potential is preferably increased gradually (or stepwise) after performing charge-discharge at a certain initial upper limit potential, from the viewpoint of improvement of the capacity maintenance ratio. Incidentally, the potential converted into lithium metal or lithium metal corresponds to a potential relative to the potential that lithium metal indicates in an electrolyte solution dissolving 1 mol/L of lithium ion therein.

Additionally, it is preferable to increase the maximal electric potential within a predetermined range for charge-discharge stepwise after performing 1 to 30 cycles of charge-discharge within the predetermined range with respect to lithium metal counter electrode.

In particular, by gradually increasing the maximal electric potential of charge-discharge electric potential for oxidation treatment when capacity at high potential like 4.7 V, 4.8 V vs. Li is used (use of high capacity), durability of an electrode can be improved even for a short-term oxidation treatment (i.e., the treatment prior to charge-discharge).

When the maximal electric potential (upper limit potential) within a certain electric potential range for charge-discharge is gradually increased, the number of cycles required for charge-discharge at each step is not specifically limited. However, the range of 1 to 10 cycles is effective. Furthermore, the number of total cycles of charge-discharge for oxidation treatment (i.e., sum of the cycles that are required for charge-discharge at each step) is not specifically limited when the maximal electric potential (upper limit potential) within a certain electric potential range for charge-discharge is gradually increased. However, the range of 4 to 20 cycles is effective.

When the maximal electric potential (upper limit potential) within a certain electric potential range for charge-discharge is gradually increased, the increase amount (elevation value) of electric potential of each step is not specifically limited. However, 0.05 V to 0.1 V is effective.

The ultimate maximal electric potential (maximal electric potential at the end) for gradually increasing the maximal electric potential (upper limit potential) within a certain electric potential range for charge-discharge is effective for the range 4.6 V to 4.9 V. However, it is not limited to the above range, and the oxidation treatment (the treatment prior to charge-discharge where electric potential is regulated) can be carried out at even higher maximal electric potential at the end only if the effect described above is obtained.

The minimal electric potential within a certain electric potential range is not specifically limited, and preferably 2 V or more but less than 3.5 V, and more preferably 2 V or more but less than 3 V with respect to the lithium metal counter electrode. By performing the oxidation treatment of charge or charge-discharge (the treatment prior to charge-discharge where electric potential is regulated) within the above range, high discharge capacity and good capacity maintenance ratio can be achieved. Meanwhile, the electric potential (V) for charge-discharge represents an electric potential per unit battery (unit cell).

Temperature of the electrode (material) for charge-discharge as the oxidation treatment (i.e., a charge-discharge electrochemical pre-treatment with controlled electric potential) can arbitrarily be selected from the range within which the working effect of the invention is not impaired. From the economic point of view, it is preferably carried out at room temperature which does not require any particular heating or cooling. Meanwhile, from the viewpoint of exhibiting higher capacity and improving the capacity maintenance ratio by short-term charge-discharge treatment, it is preferably carried out at a temperature higher than room temperature.

The process (timing) for applying the oxidation treatment (i.e., a charge-discharge electrochemical pre-treatment with controlled electric potential) is not particularly limited. For example, the oxidation treatment can he performed in the state of having constructed a battery or in the configuration of an electrode or equivalent electrodes, as discussed above.

Specifically, it can be applied for the positive electrode active material in powder state, or can be applied in the configuration of an electrode, or can be applied after having assembled a battery with a negative electrode. In the application to a battery, the oxidation treatment (i.e., a charge-discharge electrochemical pre-treatment with controlled electric potential) can be carried out by applying a certain condition by considering an electric potential profile of the electric capacity of the negative electrode to be assembled.

An application after constituting a battery is favored over an application to each electrode or electrode-like constitution, since only one oxidation treatment would be enough for oxidation of many electrodes.

Meanwhile, an application to each electrode or electrode-like constitution is favorable in that not only the conditions such as oxidation potential can be easily controlled but also only little variation in oxidation level can occur in each electrode as compared to a case in which a battery has been constituted.

The oxidizing agent used for the above oxidation treatment (2) is not specifically limited, and examples thereof include a halogen such as bromine and chlorine. The oxidizing agent may be used either singly or in combination. The oxidation with the use of an oxidizing agent can be carried out, for example, by dispersing particles of a solid solution in a solvent that doesn't dissolve the solid solution lithium-containing transition metal oxide, and adding and dissolving the oxidizing agent in the dispersion to achieve gradual oxidation.

Meanwhile, in the compositional formula (2) of the lithium-containing transition metal oxide (B), M represents Cr or Al, and x is a value of not lower than 0 and lower than 2. By selecting M from these elements while setting x within the above range, a lithium-containing transition metal oxide (B) that takes on the spinel structure is obtained.

In this case, x is preferably a value ranging from larger than 0 and smaller than 0.5, with which the spinel structure becomes more stable.

Additionally, the lithium-containing transition metal oxide (B) contained in the positive electrode active material of the present embodiment preferably has a BET specific surface area of not smaller than 0.2 m²/g and not larger than 3.0 m²/g and a 50% passing particle diameter of not more than 20 μm.

Within the above-mentioned range, it becomes possible to achieve excellent discharge operating voltage and initial rate characteristics while maintaining higher discharge capacity and charge-discharge efficiency. For example, in the case where the BET specific surface area is smaller than 0.2 m²/g, the diffusion of lithium ions from the bulk of the crystal structure is so lowered that a high initial charge-discharge efficiency and excellent initial rate characteristics are sometimes not achieved. Moreover, in the case where the BET specific surface area is larger than 3.0 m²/g and the 50% passing particle diameter exceeds 20 μm, the capacity maintenance ratio is sometimes lowered.

Furthermore, in the positive electrode active material of the present embodiment, it is preferable that the solid solution lithium-containing transition metal oxide (A) and the lithium-containing transition metal oxide (B) satisfy the following relational expression (3) and satisfy the following relational expression (4).

$$0.50 \leq M_B/(M_A+M_B) < 1.00 \quad (3)$$

$$0.75 \leq M_B/(M_A+M_B) < 1.00 \quad (4)$$

(In the formulas (3) and (4), $M_A$ represents the mass of the solid solution lithium-containing transition metal oxide (A) and $M_B$ represents the mass of the lithium-containing transition metal oxide (B).)

Within the above-mentioned range, it becomes possible to achieve excellent discharge operating voltage and initial rate characteristics while maintaining more higher discharge capacity. In addition to this, the initial charge-discharge efficiency may also become favorable.

Then, a positive electrode for a lithium ion secondary battery and a lithium ion secondary battery, according to the first embodiment of the present invention will be discussed in derail with reference to the accompanying drawings. The dimensional ratio in the drawings, cited in the following embodiment is exaggerated for the sake of explanation, and therefore it may be different from real ratio.

Figure 2:
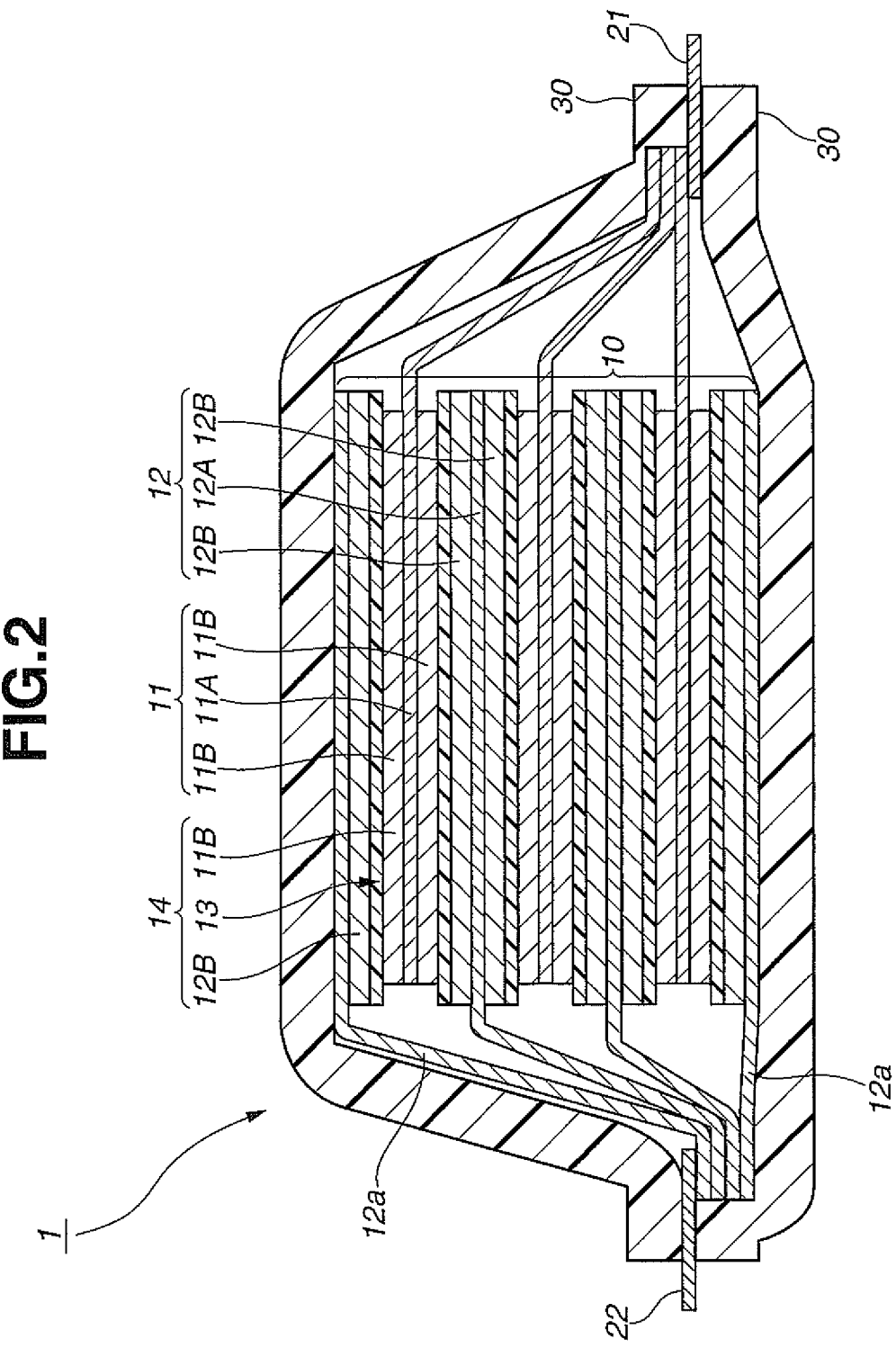
FIG. 2 A cross-sectional view schematically showing an example of a lithium ion secondary battery according to a first embodiment of the present invention.

FIG. 2 is a cross-sectional view schematically showing an example of a lithium ion secondary battery according to the first embodiment of the present invention. Incidentally, the lithium ion secondary battery as shown therein is referred to as a laminate-type lithium ion secondary battery.

As shown in FIG. 2, the lithium ion secondary battery 1 of this embodiment has a structure where a battery element 10 to which a positive electrode lead 21 and a negative electrode lead 22 are connected is sealed inside an exterior body 30 formed with laminate films. In this embodiment, the positive electrode lead 21 and the negative electrode lead 22 are provided projecting from the inside of the exterior body 30 toward the outside thereof in a direction opposite to each other. The positive electrode lead and the negative electrode lead may be provided projecting from the inside of the exterior body toward the outside thereof in the same direction, though not illustrated. The positive electrode lead and the negative electrode lead may be attached to the undermentioned positive electrode collector and negative electrode collector by ultrasonic welding or resistance welding, for example.

The positive electrode lead 21 and the negative electrode lead 22 are formed of a metal material such as aluminum (Al), copper (Cu), titanium (Ti), nickel (Ni), an alloy thereof and stainless steel (SUS). However, the material is not limited to these examples, and a conventionally known material used in a lead for use in a lithium ion secondary battery can be used.

Materials used for the positive electrode lead and the negative electrode lead may be either the same or different. Moreover, leads having been prepared separately may be connected to the undermentioned positive electrode collector and negative electrode collector, or each of the undermentioned positive electrode collector and negative electrode collector may be elongated to form a lead. Though not illustrated, the positive electrode lead and the negative electrode lead are preferably coated with a heat-resistant, insulative and heat-shrinkable tube or the like at their portions projecting outward from the exterior body, in order not to cause leakage when contacting with peripheral devices, wiring and the like thereby affecting a product (for example, automobile parts, electronic device in particular).

Furthermore, it is also possible to use a collector plate for the purpose of taking an electric current outside the battery, though not illustrated. The collector plate is electrically connected to the collector or the lead and therefore excluded from the laminated film serving as the exterior body of the battery. A material for constituting the collector plate is not particularly limited and therefore a publically known highly conductive material that has conventionally been used as a collector plate for use in the lithium ion secondary battery can be employed. Preferable examples of the material for constituting the collector plate are metal materials such as aluminum (Al), copper (Cu), titanium (Ti), nickel (Ni), an alloy thereof and stainless steel (SUS). From the viewpoint of weight reduction, corrosion resistance and high electrical conductivity, aluminum (Al), copper (Cu) and the like are more preferable. Incidentally, the positive and negative collector plates may be formed of either the same material or a different material.

For example, the exterior body 30 is preferably one formed of a film-like exterior material from the viewpoint of reduction in size and weight; however, the material is not limited to the above and a conventionally known material that has been used for the exterior body for use in the lithium ion secondary battery can be employed. More specifically, it is also possible to apply a metal can casing.

For example, a polymer-metal composite laminate film that is excellent in thermal conductivity can be cited because it is superior in enhancement of output characteristics and cooling performance and it can be suitably utilized for a battery for use in large devices such as electric vehicles and hybrid electric vehicles. More concretely, an exterior body formed with a laminate film exterior material having a three-layer structure where polypropylene as a thermocompressed layer, aluminum as a metal layer and nylon as an exterior protective layer are laminated in this order may suitably be used.

Incidentally, the exterior body may have other structure such as a laminate film not containing a metal material, a polymer film formed of polypropylene etc. and a metal film, instead of the above-mentioned laminate film.

A general constitution of the exterior body may be represented by a laminate structure expressed by "exterior protective layer/metal layer/thermo-compressed layer" (however, the exterior protective layer and the thermo-compressed layer are sometimes composed of two or more layers). The metal layer is required only to function as a moisture permeation resistant barrier film and therefore not only an aluminum foil but also a stainless foil, a nickel foil, a plated iron foil and the like are usable. Of these, the aluminum foil which is thin, lightweight and excellent in workability is preferably used.

A configuration usable in the exterior body, which is represented by an expression "exterior protective layer/metal layer/thermo-compressed layer", is exemplified by nylon/aluminum/non-oriented polypropylene, polyethylene terephthalate/aluminum/non-oriented polypropylene, polyethylene terephthalate/aluminum/polyethylene terephthalate/non-oriented polypropylene, polyethylene terephthalate/nylon/aluminum/non-oriented polypropylene, polyethylene terephthalate/nylon/aluminum/nylon/non-oriented polypropylene, polyethylene terephthalate/nylon/aluminum/nylon/polyethylene, nylon/polyethylene/aluminum/straight-chained low-density polyethylene, polyethylene terephthalate/polyethylene/aluminum/polyethylene terephthalate/low-density polyethylene, and polyethylene terephthalate/nylon/aluminum/low-density polyethylene/non-oriented polypropylene.

As shown in FIG. 2, the battery element 10 has a constitution where a positive electrode 11 including a positive electrode active material layers 11B formed on both main surfaces of a positive electrode collector 11A, an electrolyte layer 13, and a negative electrode 12 including a negative electrode active material layers 12B formed on both main surfaces of a negative electrode collector 12A are laminated two or more times. In this constitution, the positive electrode active material layer 11B formed on one of the main surfaces of the positive electrode collector 11A of the positive electrode 11 is provided to face to the negative electrode active material layer 12B adjacent to the positive electrode 11 and formed on one of the main surfaces of the negative electrode collector 12A of the negative electrode 12, through the electrolyte layer 13. Thus, the positive electrode, the electrolyte layer and the negative electrode are laminated in this order two or more times.

In such a manner, the electrolyte layer 13 and the positive and negative electrode active material layers 11B, 12B adjacent thereto establish one unit cell layer 14. The lithium ion secondary battery 1 of the present embodiment is provided to have a constitution where two or more unit cell layers 14 are laminated to be electrically connected in parallel. Incidentally, the positive and negative electrodes may be provided such that each active material layer is formed on one of the main surfaces of each collector. In the present embodiment, for example, the negative electrode active material layer 12B is formed only on one surface of a negative electrode collector 12a provided as an outermost layer of the battery element 10.

Moreover, it is also possible to provide an insulating layer (not illustrated) at the periphery of the unit cell layer, the insulating layer being for insulating the adjacent positive and negative electrode collectors from each other. The insulating layer is preferably formed of a material capable of holding an electrolyte contained in the electrolyte layer and the like and capable of preventing leakage of the electrolyte at the periphery of the unit cell layer. Concretely, general-purpose plastics and thermoplastic olefin rubbers such as polypropylene (PP), polyethylene (PE), polyurethane (PUR), polyamide-based resin (PA), polytetrafluoroethylene (PTFE), polyvinylidene fluoride (PVDF) and polystyrene (PS) are usable. Additionally, a silicone rubber is usable too.

The positive electrode collector 11A and the negative electrode collector 12A are formed of an electrically conductive material. The size of the collector can be determined according to an intended use of the battery. For example, if the collector is used in a large battery required to have a high energy density, a large-area collector is to be employed. The thickness of the collector is also not particularly limited. Normally, the thickness of the collector is about 1 to 100 µm. The shape of the collector is also not particularly limited. In the battery element 10 as shown in FIG. 2, not only a collector foil but also a grid-shaped collector (e.g. an expanded grid) etc. are usable.

Incidentally, in the case of forming a thin film alloy (one example of the negative electrode active material) directly on the negative electrode collector 12A by spattering etc., the collector foil is preferably employed.

A material for constituting the collector is not particularly limited. For example, it is possible to adopt a metal, an electrically conductive polymer material, and a resin obtained by adding an electrically conductive filler to a non-conductive polymer material.

Concrete examples of the metal are aluminum (Al), nickel (Ni), iron (Fe), stainless steel (SUS), titanium (Ti) and copper (Cu). In addition to these examples, a clad material of nickel (Ni) and aluminum (Al), a clad material of copper (Cu) and aluminum (Al), a plating material of combination of these metals are preferably used. Moreover, a foil obtained by coating a surface of metal with aluminum (Al) is also usable. Of these, aluminum (Al), stainless steel (SUS), copper (Cu) and nickel (Ni) are preferable from the viewpoint of electron conductivity, battery operating potential and the like.

Furthermore, as the electrically conductive polymer material, it is possible to cite polyaniline, polypyrrole, polythiophene, polyacetylene, polyparaphenylene, polyphenylenevinylene, polyacrylonitrile, polyoxadiazole etc. These electrically conductive polymer materials have a sufficient electrical conductivity even if the electrically conductive filler is not added, and therefore favorable in terms of facilitation of manufacturing processes and weight reduction of the collector.

Examples of the non-conductive polymer material include polyethylene (PE) (e.g. high-density polyethylene (HDPE) and low-density polyethylene (LDPE)), polypropylene (PP), polyethylene terephthalate (PET), polyether nitrile (PEN), polyimide (PI), polyamide imide (PAI), polyamide (PA), polytetrafluoroethylene (PTFE), styrene-butadiene rubber (SBR), polyacrylonitrile (PAN), polymethyl acrylate (PMA), polymethyl methacrylate (PMMA), polyvinyl chloride (PVC), polyvinylidene fluoride (PVDF) and polystyrene (PS). These non-conductive polymer materials have high potential tolerance and solvent tolerance.

To the above-mentioned electrically conductive polymer material or the non-conductive polymer material, an electrically conductive filler may be added as needed. Particularly in the case where a resin that serves as a substrate of the collector is formed only of a non-conductive polymer, the electrically conductive filler becomes necessarily essential in order to impart electrical conductivity to the resin. The electrically conductive filler can be used with no particular limitation so long as it is a material having electrical conductivity. Examples of a material excellent in electrical conductivity, potential tolerance and lithium ion blocking property include a metal, an electrically conductive carbon and the like.

Preferable examples of the metal are at least one kind of metal selected from the group consisting of nickel (Ni), titanium (Ti), aluminum (Al), copper (Cu), platinum (Pt), iron (Fe), chromium (Cr), tin (Sn), zinc (Zn), indium (In), antimony (Sb) and potassium (K) and an alloy or metal oxide containing these metals. Furthermore, as preferable examples of the electrically conductive carbon, it is possible to cite at least one kind selected from the group consisting of acetylene black, Vulcan, Black Pearls, carbon nanofiber, Ketjenblack, carbon nanotube, carbon nanohorn, carbon nanoballoon and fullerene. The amount of the electrically conductive filler to be added is not particularly limited so long as it is enough to impart a sufficient electrical conductivity to the collector. In general, the amount is about 5 to 35 mass %.

However, the electrically conductive filler is not limited to the above, and more specifically, a conventionally known material having been used as a collector for use in the lithium ion secondary battery may be used.

The positive electrode active material layer 11B contains a positive electrode active material relating to the above-mentioned first embodiment of the present invention, as a positive electrode active material. It may further contain a binder and a conductive additive as needed.

The binder is not particularly limited but exemplified by the following materials.

It is possible to cite: thermoplastic polymer such as polyethylene (PE), polypropylene (PP), polyethylene terephthalate (PET), polyether nitrile (PEN), polyacrylonitrile (PAN), polyimide (PI), polyamide (PA), cellulose, carboxymethyl cellulose (CMC), ethylene-vinyl acetate copolymer, polyvinyl chloride (PVC), styrene-butadiene rubber (SBR), isoprene rubber, butadiene rubber, ethylene-propylene rubber, ethylene-propylene-diene copolymer, styrene-butadiene-styrene block copolymer and the same to which hydrogen is added, and styrene-isoprene-styrene block copolymer and the same to which hydrogen is added; fluorine resin such as polyvinylidene fluoride (PVDF), polytetrafluoroethylene (PTFE), tetrafluoroethylene-hexafluoropropylene copolymer (FEP), tetrafluoroethylene-perfluoroalkylvinylether copolymer (PFA), ethylene-tetrafluoroethylene copolymer (ETFE), polychlorotrifluoroethylene (PCTFE), ethylene-chlorotrifluoroethylene copolymer (ECTFE) and polyvinyl fluoride (PVF); vinylidene fluoride-based fluororubber such as vinylidene fluoride-hexafluoropropylene fluororubber (VDF-HFP fluororubber), vinylidene fluoride-hexafluoropropylene-tetrafluoroethylene fluororubber (VDF-HFP-TFE fluororubber), vinylidene fluoride-pentafluoropropylene fluororubber (VDF-PFP fluororubber), vinylidene fluoride-pentafluoropropylene-tetrafluoroethylene fluororubber (VDF-PFP-TFE fluororubber), vinylidene fluoride-perfluoromethylvinylether-tetrafluoroethylene fluororubber (VDF-PFMVE-TFE fluororubber) and vinylidene fluoride-chlorotrifluoroethylene fluororubber (VDF-CTFE fluororubber); and epoxy resin. Of these, polyvinylidene fluoride, polyimide, styrene-butadiene rubber, carboxymethyl cellulose, polypropylene, polytetrafluoroethylene, polyacrylonitrile and polyamide are more preferable. These preferable binders have a good heat resistance and quite a wide potential window and so stable with respect to both positive electrode potential and negative electrode potential as to be able to be used for either of the positive and negative electrode active material layers.

However, the binder is not limited to the above, and more specifically, a publically known material that has conventionally been used as a binder for use in the lithium ion secondary battery may be used. These binders may be used either singly or in combination of two or more kinds.

The amount of the binder contained in the positive electrode active material layer is not particularly limited so long as it is enough to bind the positive electrode active material; however, it is preferably 0.5 to 15 mass %, more preferably 1 to 10 mass % relative to the positive electrode active material layer.

The conductive additive is added for improving the electrical conductivity of the positive electrode active material layer. Examples of the conductive additive include carbon materials such as carbon black (e.g. acetylene black), graphite and vapor-phase growth carbon fibers. When the positive electrode active material layer contains the conductive additive, an electron network is effectively constructed inside the positive electrode active material layer thereby probably contributing to enhancement of the output characteristics of the battery.

However, the conductive additive is not limited to these examples, and more specifically, a conventionally known material that has been used as a conductive additive for use in the lithium ion secondary battery may be used. These conductive additives may be used either singly or in combination of two or more kinds.

It is also possible to use an electrically conductive binder that functions as both the conductive additive and the binder, instead of these conductive additives and the binders. Additionally, the electrically conductive binder may be used together with either or both of the conductive additive and the binder. As the electrically conductive binder, TAB-2 that has already commercially been available from Hohsen Corporation is applicable, for example.

Additionally, the density of the positive electrode active material layer is preferably not lower than 2.5 g/cm$^3$ and not higher than 3.0 g/cm$^3$.

When the positive electrode active material layer has a density of lower than 2.5 g/cm$^3$, it is difficult to improve the discharge capacity since the weight (the loading weight) per unit volume cannot be enhanced. Meanwhile, in the case where the positive electrode active material layer has a density of higher than 3.0 g/cm$^3$, the amount of airspace in the positive electrode active material layer is considerably decreased so as to sometimes reduce the permeability of a nonaqueous electrolyte solution and the diffusion of lithium ions.

The negative electrode active material layer 12B contains lithium, a lithium alloy or a negative electrode material capable of absorbing and releasing the lithium, as the negative electrode active material. It may further contain a binder and a conductive additive as necessary. As the binder and the conductive additive, the above-mentioned examples are usable.

Examples of the negative electrode material capable of absorbing and releasing lithium include: carbon materials (including those containing 10 mass % or less silicon nanoparticles) like high crystalline carbon graphite (natural graphite, artificial graphite or the like), low crystalline carbon (soft carbon and hard carbon), carbon black (Ketjen Black, acetylene black, channel black, lamp black, oil furnace black, thermal black or the like), fullerene, carbon nanotube, carbon nanofiber, carbon nanohorn, and carbon fibrils; a single body element which can form an alloy with lithium such as silicon (Si), germanium (Ge), tin (Sn), lead (Pb), aluminum (Al), indium (In), zinc (Zn), hydrogen (H), calcium (Ca), strontium (Sr), barium (Ba), ruthenium (Ru), rhodium (Rh), iridium (Ir), palladium (Pd), platinum (Pt), silver (Ag), gold (Au), cadmium (Cd), mercury (Hg), gallium (Ga), thallium (Tl), carbon (C), nitrogen (N), antimony (Sb), bismuth (Bi), oxygen (O), sulfur (S), selenium (Se), tellurium (Te), and chlorine (Cl), oxides containing these elements (silicon monooxide (SiO), $SiO_x$ (0<x<2), tin dioxide ($SnO_2$), $SnO_x$ (0<x<2), $SnSiO_3$ or the like), and carbides containing these elements (silicon carbide (SiC) or the like); a metal material such as lithium metal; and a lithium-transition metal composite oxide such as lithium-titanium composite oxide (lithium titanate: $Li_4Ti_5O_{12}$). However, the negative electrode material is not limited to the above examples, and more specifically, a conventionally known material that has been used as a negative electrode active material for use in the lithium ion secondary battery may be used. The negative electrode active material may be may be used either singly or in combination of two or more kinds.

In this embodiment, it is preferable that the carbon material is formed of graphite coated at its surface with a non-crystalline carbon layer and not having a scale-like structure and that the carbon material has a BET specific surface area of not smaller than 0.8 $m^2/g$ and not larger than 1.5 $m^2/g$ and a tap density of not lower than 0.9 $g/cm^3$ and not higher than 1.2 $g/cm^3$. The carbon material formed of graphite coated at its surface with a non-crystalline carbon layer and not having a scale-like structure is preferable because it achieves a high diffusion of lithium ions into a layered structure of graphite. A carbon material having a BET specific surface area of not smaller than 0.8 $m^2/g$ and not larger than 1.5 $m^2/g$ is preferable since the capacity maintenance ratio can be more improved. Furthermore, a carbon material having a tap density of not lower than 0.9 $g/cm^3$ and not higher than 1.2 $g/cm^3$ allows improving the weight (the loading weight) per unit volume thereby enhancing the discharge capacity.

In this embodiment, it is preferable that the negative electrode active material layer containing at least the carbon material and the binder has a BET specific surface area of not smaller than 2.0 $m^2/g$ and not larger than 3.0 $m^2/g$. If the negative electrode active material layer has a BET specific surface area of not smaller than 2.0 $m^2/g$ and not larger than 3.0 $m^2/g$, the permeability of a nonaqueous electrolyte solution can be improved and the capacity maintenance ratio is also improved thereby suppressing a gas generation caused by decomposition of the nonaqueous electrolyte solution.

Additionally, in this embodiment, the negative electrode active material layer containing at least the carbon material and the binder preferably has a BET specific surface area of not smaller than 2.01 $m^2/g$ and not larger than 3.5 $m^2/g$ after being subjected to pressure forming. When the negative electrode active material layer has a BET specific surface area of not smaller than 2.01 $m^2/g$ and not larger than 3.5 $m^2/g$ after being subjected to pressure forming, the permeability of a nonaqueous electrolyte solution can be improved and the capacity maintenance ratio is also improved thereby suppressing a gas generation caused by decomposition of the nonaqueous electrolyte solution.

Furthermore, in this embodiment, it is preferable that an increase amount of the BET specific surface area of the negative electrode active material layer containing at least the carbon material and the binder, between before and after pressure forming, is not smaller than 0.01 $m^2/g$ and not larger than 0.5 $m^2/g$. With this, the negative electrode active material layer obtains a BET specific surface area of not smaller than 2.01 $m^2/g$ and not larger than 3.5 $m^2/g$ after being subjected to pressure forming, so that the permeability of a nonaqueous electrolyte solution can be improved and the capacity maintenance ratio is also improved thereby suppressing a gas generation caused by decomposition of the nonaqueous electrolyte solution.

The thickness of each active material layer (an active material layer disposed on one surface of the collector) is not particularly limited and therefore it is possible to refer to a conventional knowledge about batteries. For example, the thickness of each active material layer is normally about 1 to 500 µm, preferably 2 to 100 µm, considering an intended use (an output-oriented use, an energy-oriented use or the like) of the battery and the ion conductivity.

If particle diameters suitable for obtaining the effects unique to each active material are different, the particle diameters may be used in combination suitable for obtaining the effects unique to each active material; therefore it is not necessary to uniformalize particle diameters of all active materials.

For example, in the case of using a particle-form oxide as the positive electrode active material, the average particle diameter of the oxide is required only to be nearly equal to the average particle diameter of the positive electrode active material contained in an already-existing positive electrode active material layer and therefore not particularly limited. From the viewpoint of enhancement of output characteristics, the average particle diameter is required only to be 1 to 20 µm. In this specification, the term "particle diameter" refers to the maximal distance between any two points on the contour of an observed surface of an active material particle observed by using an observing means such as the scanning electron microscope (SEM) and the transmission electron microscope (TEM). As a value of "an average particle diameter", there is adopted one calculated with an observing means such as the scanning electron microscope (SEM) and the transmission electron microscope (TEM) as an average value of particle diameters of particles observed in several to several tens of fields of view. The particle diameter and the average particle diameter of other component may similarly be defined.

However, the average particle diameter is not particularly limited to the above-mentioned range, and more specifically, it will be understood that an average particle diameter outside this range may be acceptable so long as the working effect of the present embodiment develops effectually.

The electrolyte layer 13 can be exemplified by: one that forms a layered structure by letting the undermentioned separator hold an electrolyte solution, a polymer gel electrolyte or a solid polymer electrolyte; one that forms a laminated structure by using the polymer gel electrolyte or the solid polymer electrolyte and the like.

The electrolyte solution is preferably one ordinarily used in the lithium ion secondary battery, and more specifically, it takes the form of supporting salts (lithium salts) being dissolved in an organic solvent. Examples of the lithium salts include at least one kind of lithium salt selected from inorganic acid anionic salts such as lithium hexafluorophosphate ($LiPF_6$), lithium tetrafluoroborate ($LiBF_4$), lithium perchlorate ($LiClO_4$), lithium hexafluoroarsenate ($LiAsF_6$), lithium hexafluorotantalate ($LiTaF_6$), lithium tetrachloroaluminate ($LiAlCl_4$) and lithium decachlorodecaborate ($Li_2B_{10}Cl_{10}$), and organic acid anionic salts such as lithium trifluoromethanesulphonate ($LiCF_3SO_3$), lithium bis(trifluoromethanesulphonyl)imide ($Li(CF_3SO_2)_2N$) and Lithium bis(pentafluoroethanesulfonyl)imide (Li(C$_2$F$_5$SO$_2$)$_2$N). Of these examples, lithium hexafluorophosphate (LiPF$_6$) is preferable.

Moreover, as an organic solvent, it is possible to use at least one kind of organic solvent selected from the group consisting of cyclic carbonates, fluorine-containing cyclic carbonates, chain carbonates, fluorine-containing chain carbonates, aliphatic carboxylate esters, fluorine-containing aliphatic carboxylate esters, γ-lactones, fluorine-containing γ-lactones, cyclic ethers, fluorine-containing cyclic ethers, chain ethers and fluorine-containing chain ethers.

Examples of the cyclic carbonates are propylene carbonate (PC), ethylene carbonate (EC) and butylene carbonate (BC). Additionally, examples of the fluorine-containing cyclic carbonates include fluoroethylene carbonate (FEC). Examples of the chain carbonates are dimethyl carbonate (DMC), diethyl carbonate (DEC), ethyl methyl carbonate (EMC), methyl propyl carbonate (MPC), ethyl propyl carbonate (EPC) and dipropyl carbonate (DPC). Examples of the aliphatic carboxylate esters include methyl formate, methyl acetate and ethyl propionate. Examples of the γ-lactones include γ-butyrolactone. Examples of the cyclic ethers include tetrahydrofuran, 2-methyltetrahydrofuran and 1,4-dioxane. Examples of the chain ethers include 1,2-ethoxyethane (DEE), ethoxymethoxyethane (EME), diethyl ether, 1,2-dimethoxyethane and 1,2-dibutoxyethane. In addition, it is also possible to cite nitriles such as acetonitrile and amides such as dimethylformamide. These organic solvents may be used singly or in combination of two or more kinds.

To the electrolyte solution, there may be added an additive exemplified by organic sulfone-based compound such as sultone derivative and cyclic sulfonate ester, organic disulfone-based compound such as disultone derivative and cyclic disulfonate ester, vinylene carbonate derivative, ethylene carbonate derivative, ester derivative, divalent phenol derivative, ethylene glycol derivative, terphenyl derivative and phosphate derivative. These additives can form a coating on the surface of the negative electrode active material thereby reducing a gas generation caused in the battery and allowing an improvement of the capacity maintenance ratio.

Examples of the organic sulfone-based compound include 1,3-propane sulfone (saturated sultone) and 1,3-propene sultone (unsaturated sultone). Examples of the organic disulfone-based compound include methylene methanedisulfonate. Examples of the vinylene carbonate derivative include vinylene carbonate (VC). Examples of the ethylene carbonate derivative include fluoroethylene carbonate (FEC). Examples of the ester derivative include 4-biphenylyl acetate, 4-biphenylyl benzoate, 4-biphenylylbenzil carboxylate and 2-biphenylyl propionate. Examples of the divalent phenol derivative include 1,4-diphenoxybenzene and 1,3-diphenoxybenzene. Examples of the ethylene glycol derivative include 1.2-diphenoxyethane, 1-(4-biphenylyloxy)-2-phenoxyethane and 1-(2-biphenylyloxy)-phenoxyethane. Examples of the terphenyl derivative include o-terphenyl, m-terphenyl, p-terphenyl, 2-methyl-o-terphenyl and 2,2-dimethyl-o-terphenyl. Examples of the phosphate derivative include triphenyl phosphate.

The separator is concretely in the form of a microporous film, a porous flat plate or a nonwoven formed of polyolefin such as polyethylene (PE) and polypropylene (PP).

The polymer gel electrolyte can be exemplified by one containing a polymer and an electrolyte solution (components of the polymer gel electrolyte) at a conventionally known ratio. For example, the content of the polymer and the electrolyte solution is preferably several mass % to about 98 mass % from the viewpoint of the ion conductivity.

The polymer gel electrolyte is obtained such that the electrolyte solution used in a general lithium ion secondary battery contains a solid polymer electrolyte having ion conductivity. However, the polymer gel electrolyte is not limited to the above and exemplified by one where a polymer having no lithium ion conductivity holds the same electrolyte solution in its structure.

The polymer having no lithium ion conductivity, usable in the polymer gel electrolyte is exemplified by polyvinylidene fluoride (PVDF), polyvinyl chloride (PVC), polyacrylonitrile (PAN) and polymethyl methacrylate (PMMA) but not limited to these examples. Though polyacrylonitrile (PAN) and polymethyl methacrylate (PMMA) can be said to be a polymer having ion conductivity because these are rather classified into a group having little ion conductivity, this specification cites those as a polymer having no lithium ion conductivity and usable in the polymer gel electrolyte.

Examples of the solid polymer electrolyte include one not containing an organic solvent while having a constitution established by dissolving the lithium salts into polyethylene oxide (PEO), polypropylene oxide (PPO) etc. Accordingly, in the case where the electrolyte layer is formed of the solid polymer electrolyte, there is no fear of liquid leakage from the battery and the reliability of the battery can be improved.

From the viewpoint of reduction of internal resistance, a thinner electrolyte layer is preferable. The thickness thereof is ordinarily 1 to 100 μm, preferably 5 to 50 μm.

A matrix polymer for the polymer gel electrolyte and the solid polymer electrolyte can exhibit high mechanical strength when a cross-linked structure is formed. The cross-linked structure may be formed in such a manner that a polymerizable polymer used for polymer electrolyte formation (for example, polyethylene oxide (PEO) and polypropylene oxide (PPO)) is subjected to a polymerization treatment such as thermal polymerization, ultraviolet polymerization, radiation polymerization and electron beam polymerization, by use of an appropriate polymerization initiator.

Then, a method for producing the lithium ion secondary battery according to the above-mentioned embodiment will be discussed with reference to some examples.

An example of the method for producing the lithium ion secondary battery will be discussed. First of all, a positive electrode is produced. For example, in the case of using a granular positive electrode active material, the positive electrode active material is mixed with a conductive additive, a binder and a viscosity adjusting solvent as needed thereby preparing a slurry for the positive electrode.

The slurry for the positive electrode is thereafter applied to a positive electrode collector, dried and then subjected to pressure forming, thereby forming a positive electrode active material layer.

Then, a negative electrode is produced. For example, in the case of using a granular negative electrode active material, the negative electrode active material is mixed with a conductive additive, a binder and a viscosity adjusting solvent as needed thereby preparing a slurry for the negative electrode. Thereafter, the slurry for the negative electrode is applied to a negative electrode collector, dried and then subjected to pressure forming, thereby forming a negative electrode active material layer.

Subsequently, a positive electrode lead is attached to the positive electrode while a negative electrode lead is attached to the negative electrode, followed by laminating the positive electrode, a separator and the negative electrode. The laminated product is sandwiched between polymer-metal composite laminate sheets and then their peripheral edge portions are heat-sealed with the exception of one side to obtain a bag-like exterior body Then, a nonaqueous electrolyte solution containing a lithium salt such as lithium hexafluorophosphate and an organic solvent such as ethylene carbonate is prepared and then poured into the exterior body from the opening thereof, followed by heat-sealing the opening of the exterior body. Thus a laminate-type lithium ion secondary battery is completed.

Another example of the method of producing the lithium ion secondary battery will be discussed. First of all, a positive electrode is produced. For example, in the case of using a granular positive electrode active material, a precursor of the above-mentioned solid solution lithium-containing transition metal oxide is mixed with a conductive additive, a binder and a viscosity adjusting solvent as needed thereby preparing a slurry for the positive electrode.

The slurry for the positive electrode is thereafter applied to a positive electrode collector, dried and then subjected to pressure forming, thereby forming a positive electrode active material layer.

Then, a negative electrode is produced. For example, in the case of using a granular negative electrode active material, the negative electrode active material is mixed with a conductive additive, a binder and a viscosity adjusting solvent as needed thereby preparing a slurry for the negative electrode. Thereafter, the slurry for the negative electrode is applied to a negative electrode collector, dried and then subjected to pressure forming, thereby forming a negative electrode active material layer.

Subsequently, a positive electrode lead is attached to the positive electrode while a negative electrode lead is attached to the negative electrode, followed by laminating the positive electrode, a separator and the negative electrode. The laminated product is sandwiched between polymer-metal composite laminate sheets and then their peripheral edge portions heat-sealed with the exception of one side to obtain a bag-like exterior body.

Then, a nonaqueous electrolyte solution containing a lithium salt such as lithium hexafluorophosphate and an organic solvent such as ethylene carbonate is prepared and then poured into the exterior body from the opening thereof, followed by heat-sealing the opening of the exterior body Furthermore, a predetermined charge or charge-discharge as mentioned above is conducted. Thus a laminate-type lithium ion secondary battery is completed.

EXAMPLES

Hereinafter, the present invention will more specifically be discussed with reference to Examples; however, the present invention is not limited to these Examples.

Example 1

<Synthesis of Solid Solution Lithium-Containing Transition Metal Oxide (A1)>

A solid solution lithium-containing transition metal oxide (A1) was synthesized according to composite carbonate process. Sulfates of nickel (Ni), cobalt (Co) and manganese (Mn) were used as starting materials to prepare a 2 mol/L sulfate aqueous solution. A 2 mol/L sodium carbonate aqueous solution was used as a precipitant and a 0.2 mol/L aqueous ammonia was used as a pH adjusting agent.

While stirring the composite sulfate aqueous solution by a magnetic stirrer, the sodium carbonate aqueous solution was added dropwise thereto, thereby precipitating a precursor. Then suction filtration was conducted and precipitated substances deposited on a filter paper were dried, thereby obtaining a precursor of a composite hydroxide.

Thereafter, the thus obtained precursor and lithium carbonate were pulverized and mixed at a certain molar ratio, followed by provisional calcination at 500° C. and 12 to 24 hours of main calcination in air at 800 to 1000° C., thereby obtaining a target compound.

<Synthesis of Lithium-Containing Transition Metal Oxide (B1)>

A lithium-containing transition metal oxide (B1) having a spinel structure was synthesized according to solid phase method. Manganese oxide, lithium carbonate and aluminum hydroxide were used as raw materials and weighed to have certain amounts, followed by being pulverized and mixed in use of an agate mortar and a pestle. The obtained mixture was calcined in air at 1000° C. for 12 hours, followed by being subjected to annealing treatment in oxygen atmosphere at 600° C. for 10 hours, thereby obtaining a target compound.

<Composition of Solid Solution Lithium-Containing Transition Metal Oxide (A1)>

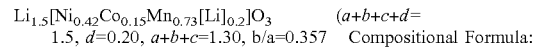

Compositional Formula: $Li_{1.5}[Ni_{0.42}Co_{0.15}Mn_{0.73}[Li]_{0.2}]O_3$ ($a+b+c+d=$1.5, $d=0.20$, $a+b+c=1.30$, $b/a=0.357$)

<Composition of Lithium-Containing Transition Metal Oxide (B1)>

Compositional Formula: $LiAl_{0.1}Mn_{1.9}O_4$ ($x=0.1$)

<Composition of Slurry for Positive Electrode>

| Positive Electrode Active Material: | |
|---|---|
| Solid solution lithium-containing transition metal oxide (A1) | 75 parts by mass |
| Lithium-containing transition metal oxide (B1) | 25 parts by mass |
| Conductive Additive: | |
| Scale-like graphite | 2.0 parts by mass |
| Acetylene black | 3.5 parts by mass |
| Binder: | |
| Polyvinylidene fluoride (PVDF) | 5.5 parts by mass |
| Solvent: | |
| N-methylpyrrolidone (NMP) | 74 parts by mass |

<Production of Slurry for Positive Electrode>

A binder solution was produced by dissolving 5.5 parts by mass of a binder in 49.5 parts by mass of NMP. Then, 55.0 parts by mass of the binder solution was added to a powdery mixture of 5.5 parts by mass of a conductive additive and 100 parts by mass of a positive electrode active material and kneaded by using a planetary mixer (available from PRIMIX Corporation under the trade name of HIVIS MIX Model 2P-03), followed by adding 24.5 parts by mass of NMP to the kneaded substance, thereby obtaining a slurry for a positive electrode (solid content: 60 mass %).

<Application and Drying of Slurry for Positive Electrode>

The thus obtained slurry for a positive electrode was applied onto one surface of a collector formed with an aluminum foil having a thickness of 20 μm, by using a bar coater. The collector to which the slurry for a positive electrode was applied was dried on a hot plate at 120 to 130° C. for 10 minutes so that the amount of NMP that remained in the positive electrode active material layer was adjusted to 0.02 mass % or lower.

<Press of Positive Electrode>

The thus obtained sheet-like positive electrode was subjected to press forming by a roll press machine and then cut a positive electrode (C1) out thereof, the positive electrode (C1) having on its one surface the positive electrode active material layer with a weight of about 3.5 mg/cm$^2$, a thickness of about 50 μm and a density of 2.70 g/cm$^3$.

<Drying of Positive Electrode>

In the use of the positive electrode (C1), drying treatment was performed in a vacuum drying oven. After placing the positive electrode (C1) inside the drying oven, pressure was reduced to 100 mmHg (1.33×10$^4$Pa) at room temperature (25° C.) thereby removing air from the inside of the drying oven. Then the drying oven was increased in temperature at 10° C./min. up to 120° C. while feeding nitrogen gas (at 100 cm$^3$/min). When reaching a temperature of 120° C., pressure was reduced again to exhaust nitrogen gas from the oven and this state was kept for 12 hours. Thereafter, the temperature was decreased to room temperature thereby obtaining a positive electrode (C11).

<Production of Lithium Ion Secondary Battery>

The positive electrode (C11) produced in Example 1 was punched to have a diameter of 15 mm and then dried again for 2 hours at 100° C. by vacuum drying machine before production of a battery so as to be put to use. Additionally, a porous film formed of polypropylene, a coin cell member and the like were used upon previously being dried for 24 hours or more at room temperature in a glove box in argon atmosphere.

In the glove box filled with argon atmosphere, the positive electrode and a negative electrode formed of metal lithium were disposed to face to each other, and two separators (Material: polypropylene, Thickness: 20 μm) were disposed therebetween.

Subsequently, the thus obtained laminate of the negative electrode, the separators and the positive electrode was disposed on a bottom side of a coin cell (CR2032, Material: stainless steel (SUS316)).

Furthermore, a gasket for maintaining the insulation between the positive and negative electrodes was attached thereto. The undermentioned electrolyte solution in an amount of 150 μL was poured by using a syringe. A spring and a spacer were laminated and a top side of the coin cell was superimposed thereon, followed by sealing it by swaging, thereby producing a lithium ion secondary battery.

As the electrolyte solution, there was used one obtained by dissolving lithium hexafluorophosphate (LiPF$_6$) as a supporting salt into an organic solvent where ethylene carbonate (EC) and diethyl carbonate (DEC) were mixed at a ratio of EC:DEC=1:2 (volume ratio) so that the lithium hexafluorophosphate had a concentration of 1 mol/L. There was no addition of a peculiar additive and the like to the electrolyte solution.

The above-mentioned battery element was set to a jig for attaching an evaluation cell while a positive electrode lead and a negative electrode lead were attached respectively to end portions of tabs of the battery element, upon which evaluations were conducted.

<Electrochemical Pre-treatment>

Charge was performed according to constant current/constant voltage (CCCV) method where the battery was charged at a rate of 0.1 C until its maximal voltage reached 4.2V and then kept for about 24 hours, while discharge was performed according to constant current discharge (CC) method where the battery was discharged at a rate of 1.0 C until its minimal voltage reached 2.5V.

Subsequently, as shown in Table 1, there were carried out: two constant current charge-discharge cycles of charging at a rate of 0.1 C until the maximal voltage reached 4.5V and then discharging at a rate of 0.1 C until the minimal voltage reached 2.0V; one constant current charge-discharge cycle of charging at a rate of 0.1 C until the maximal voltage reached 4.6V and then discharging at a rate of 0.1 C until the minimal voltage reached 2.0V; one constant current charge-discharge cycle of charging at a rate of 0.1 C until the maximal voltage reached 4.7V and then discharging at a rate of 0.1 C until the minimal voltage reached 2.0V; one constant current charge-discharge cycle of charging at a rate of 0.1 C until the maximal voltage reached 4.8V and then discharging at a rate of 0.1 C until the minimal voltage reached 2.0V; and one cycle of performing a constant current/constant voltage-charge at a rate of 0.1 C until the maximal voltage reached 4.8V and then performing a constant current-discharge at a rate of 0.1 C until the minimal voltage reached 2.0V. Any of these cycles were operated at room temperature. Thus, a lithium ion secondary battery of this Example was obtained.

TABLE 1

| Pattern | State (—) | Upper Limit Voltage (V) | Lower Limit Voltage (V) | Current Rate (C) | Time (h) | Mode (—) | Number of Repetitions (Times) |
|---|---|---|---|---|---|---|---|
| 1 | Charge |  | 4.5 | 0.1 | 15 | CC | 2 |
|   | Discharge | 2.0 |  | 0.1 | 15 | CC |  |
| 2 | Charge |  | 4.6 | 0.1 | 15 | CC | 1 |
|   | Discharge | 2.0 |  | 0.1 | 15 | CC |  |
| 3 | Charge |  | 4.7 | 0.1 | 15 | CC | 1 |
|   | Discharge | 2.0 |  | 0.1 | 15 | CC |  |
| 4 | Charge |  | 4.8 | 0.1 | 15 | CC | 1 |
|   | Discharge | 2.0 |  | 0.1 | 15 | CC |  |
| 5 | Charge |  | 4.8 | 0.1 | 15 | CCCV | 1 |
|   | Discharge | 2.0 |  | 0.1 | 15 | CC |  |

Example 2

The procedures of Example 1 were repeated with the exception that in the composition of the slurry for a positive electrode the solid solution lithium-containing transition metal oxide (A1) was changed to 50 parts by mass and the lithium-containing transition metal oxide (B1) was changed to 50 parts by mass, thereby obtaining a lithium ion secondary battery of this Example.

Example 3

The procedures of Example 1 were repeated with the exception that in the composition of the slurry for a positive electrode the solid solution lithium-containing transition metal oxide (A1) was changed to 25 parts by mass and the lithium-containing transition metal oxide (B1) was changed to 75 parts by mass, thereby obtaining a lithium ion secondary battery of this Example.

Example 4

<Synthesis of Solid Solution Lithium-Containing Transition Metal Oxide (A2)>
A solid solution lithium-containing transition metal oxide (A2) was synthesized according to composite carbonate process, similar to the solid solution lithium-containing transition metal oxide (A1) synthesized in Example 1.
<Composition of Solid Solution Lithium-containing Transition Metal Oxide (A2)>

Compositional Formula: $Li_{1.5}[Ni_{0.4375}Co_{0.175}Mn_{0.7375}[Li]_{0.15}]_3$ ($a+b+c+d=1.5$, $d=0.15$, $a+b+c=1.35$)

The procedures of Example 1 were repeated with the exception that in the composition of the slurry for a positive electrode the solid solution lithium-containing transition metal oxide (A2) was 75 parts by mass and the lithium-containing transition metal oxide (B1) was 25 parts by mass, thereby obtaining a lithium ion secondary battery of this Example.

Example 5

The procedures of Example 1 were repeated with the exception that in the composition of the slurry for a positive electrode the solid solution lithium-containing transition metal oxide (A2) was changed to 50 parts by mass and the lithium-containing transition metal oxide (B1) was changed to 50 parts by mass, thereby obtaining a lithium ion secondary battery of this Example.

Example 6

The procedures of Example 1 were repeated with the exception that in the composition of the slurry for a positive electrode the solid solution lithium-containing transition metal oxide (A2) was changed to 25 parts by mass and the lithium-containing transition metal oxide (B1) was changed to 75 parts by mass, thereby obtaining a lithium ion secondary battery of this Example.

Comparative Example 1

The procedures of Example 1 were repeated with the exception that in the composition of the slurry for a positive electrode the solid solution lithium-containing transition metal oxide (A1) was changed to 100 parts by mass, thereby obtaining a lithium ion secondary battery of this Example.

Comparative Example 2

The procedures of Example 1 were repeated with the exception that in the composition of the slurry for a positive electrode the solid solution lithium-containing transition metal oxide (A2) was changed to 100 parts by mass, thereby obtaining a lithium ion secondary battery of this Example.

Comparative Example 3

The procedures of Example 1 were repeated with the exception that in the composition of the slurry for a positive electrode the lithium-containing transition metal oxide (B1) was changed to 100 parts by mass, thereby obtaining a lithium ion secondary battery of this Example. Specifications of the positive electrode active material of each of the above-mentioned Examples are shown in Table 2.

TABLE 2

| | Positive Electrode Active Material | | | | | | | | | Characteristic Evaluation | | | |
|---|---|---|---|---|---|---|---|---|---|---|---|---|---|
| | Solid solution lithium-containing transition metal oxide (A) | | | | | Lithium-containing transition metal oxide (B) | | | | | | | Rate |
| Classification | Kind | Spinel structure change ratio K | BET specific surface area (m²/g) | 50% passing particle diameter (μm) | Content (%) | Kind | BET specific surface area (m²/g) | 50% passing particle diameter (μm) | Content (%) | $M_B/(M_A+M_B)$ | Discharge Capacity (0.1 C) | Capacity maintenance ratio (%) | Average voltage (V) | characteristic (2.5 C/ 0.1 C) (%) |
| Example 1 | A1 | 0.847 | 4.7 | 6.0 | 75 | B1 | 0.73 | 10.3 | 25 | 0.25 | 213.2* | 86.2* | 3.74* | 69.8* |
| Example 2 | A1 | 0.847 | 4.7 | 6.0 | 50 | B1 | 0.73 | 10.3 | 50 | 0.50 | 176.0 | 88.5* | 3.75* | 74.8 |
| Example 3 | A1 | 0.847 | 4.7 | 6.0 | 25 | B1 | 0.73 | 10.3 | 75 | 0.75 | 146.6 | 89.8* | 3.80* | 79.0 |
| Example 4 | A2 | 0.82 | 4.8 | 5.9 | 75 | B1 | 0.73 | 10.3 | 25 | 0.25 | 210.1* | 82.4 | 3.76 | 71.5* |
| Example 5 | A2 | 0.82 | 4.8 | 5.9 | 50 | B1 | 0.73 | 10.3 | 50 | 0.50 | 180.3* | 87.5* | 3.78* | 75.3* |
| Example 6 | A2 | 0.82 | 4.8 | 5.9 | 25 | B1 | 0.73 | 10.3 | 75 | 0.75 | 148.6* | 88.6 | 3.83* | 80.9* |
| Comparative Example 1 | A1 | 0.847 | 4.7 | 6.0 | 100 | — | — | — | 0 | 0 | 234.4 | 84.3 | 3.61 | 64.4 |
| Comparative Example 2 | A2 | 0.823 | 4.8 | 5.9 | 100 | — | — | — | 0 | 0 | 227.2 | 83.3 | 3.71 | 64.1 |

TABLE 2-continued

| | | Positive Electrode Active Material | | | | | | | | | | | |
|---|---|---|---|---|---|---|---|---|---|---|---|---|---|
| | | Solid solution lithium-containing transition metal oxide (A) | | | | Lithium-containing transition metal oxide (B) | | | | | Characteristic Evaluation | | |
| Classification | Kind | Spinel structure change ratio K | BET specific surface area (m²/g) | 50% passing particle diameter (μm) | Content (%) | Kind | BET specific surface area (m²/g) | 50% passing particle diameter (μm) | Content (%) | $M_B/(M_A + M_B)$ | Discharge Capacity (0.1 C) | Capacity maintenance ratio (%) | Average voltage (V) | Rate characteristic (2.5 C/0.1 C) (%) |
| Comparative Example 3 | — | — | — | — | 0 | B1 | 0.73 | 10.3 | 100 | 1 | 120.5 | 90.8 | 3.85 | 85.4 |

[Performance Evaluation]

(Discharge Capacity and Average Voltage of Battery)

On the lithium ion secondary battery of each of the above-mentioned Examples, a cycle of performing a constant current/constant voltage-charge at a rate of 0.1 C until the maximal voltage reached 4.8V and then performing a constant current-discharge at a rate of 0.1 C until the minimal voltage reached 2.0V was conducted two times, as shown in Table 3. At this time, the discharge capacity and the average voltage of the battery were measured and calculated. Incidentally, in the present invention, a discharge operating voltage was evaluated from the average voltage. The thus obtained results are also shown in Table 2.

cycles of performing a constant current/constant voltage charge at a rate of 0.1 C until the maximal voltage reached 4.8V and then performing a constant current discharge at a rate of 0.1 C until the minimal voltage reached 2.0V; two cycles of performing a constant current/constant voltage charge at a rate of 0.1 C until the maximal voltage reached 4.8V and then performing a constant current discharge at a rate of 0.5 C until the minimal voltage reached 2.0V; two cycles of performing a constant current/constant voltage charge at a rate of 0.1 C until the maximal voltage reached 4.8V and then performing a constant current discharge at a rate of 1 C until the minimal voltage reached 2.0V; two cycles of performing a constant current/constant voltage

TABLE 3

| Pattern | State (-) | Upper Limit Voltage (V) | Lower Limit Voltage (V) | Current Rate (C.) | Time (h) | Mode (-) | Number of Repetitions (Times) |
|---|---|---|---|---|---|---|---|
| 1 | Charge | 4.8 | | 0.1 | 15 | CCCV | 2 |
| | Discharge | | 2.0 | 0.1 | 15 | CC | |

(Charge-Discharge Efficiency)

Moreover, on the lithium ion secondary battery of each of the above-mentioned Examples, the charge capacity and the discharge capacity in the electrochemical pre-treatment and in the main charge-discharge cycle were calculated. A charge-discharge efficiency was calculated from a ratio of discharge capacity of the final discharge in the main charge-discharge cycle to the sum of a difference of charge capacity in the charge-discharge cycle in the electrochemical pre-treatment, a difference of charge capacity in the main charge-discharge cycle and the charge capacity in the final charge. The thus obtained results are also shown in Table 2.

On the lithium ion secondary battery of each of the above-mentioned Examples, there were conducted: two charge at a rate of 0.1 C until the maximal voltage reached 4.8V and then performing a constant current discharge at a rate of 2.5 C until the minimal voltage reached 2.0V; and two cycles of performing a constant current/constant voltage charge at a rate of 0.1 C until the maximal voltage reached 4.8V and then performing a constant current discharge at a rate of 0.1 C until the minimal voltage reached 2.0V, as shown in Table 4. Any of these cycles were operated at room temperature. At this time, the discharge capacity of the battery in each rate was measured, and the capacity maintenance ratio was calculated, and the initial rate characteristic was calculated from the ratio of the capacity maintenance ratio of the rate 2.5 C to the capacity maintenance ratio of the rate 0.1 C. The thus obtained results are also shown in Table 2.

TABLE 4

| Pattern | State (—) | Upper Limit Voltage (V) | Lower Limit Voltage (V) | Current Rate (C) | Time (h) | Mode (—) | Number of Repetitions (Times) |
|---|---|---|---|---|---|---|---|
| 1 | Charge | | 4.8 | 0.1 | 15 | CCCV | 2 |
|   | Discharge | 2.0 | | 0.1 | 15 | CC | |
| 2 | Charge | | 4.8 | 0.1 | 15 | CCCV | 2 |
|   | Discharge | 2.0 | | 0.5 | 15 | CC | |
| 3 | Charge | | 4.8 | 0.1 | 15 | CCCV | 2 |
|   | Discharge | 2.0 | | 1.0 | 15 | CC | |
| 4 | Charge | | 4.8 | 0.1 | 15 | CCCV | 2 |
|   | Discharge | 2.0 | | 2.5 | 15 | CC | |
| 5 | Charge | | 4.8 | 0.1 | 15 | CCCV | 2 |
|   | Discharge | 2.0 | | 0.1 | 15 | CC | |

It is confirmed from Table 2 that Examples 1 to 6 included in the scope of the present invention can achieve excellent discharge operating voltage and initial rate characteristic while keeping high discharge capacity as compared with Comparative Examples 1 to 3 not included in the present invention. Among the results as shown in Table 2, a result accompanied with a symbol "*" represents a result improved from the arithmetic average obtained according to mixture ratios determined from the result of Comparative Example 1 or 2 and the result of Comparative Example 3. Among these results, Examples 1 and 4 are considered to be particularly superior.

Additionally, the solid solution lithium-containing transition metal oxide (A) extracted by disassembling the lithium ion secondary battery of each of the above-mentioned Examples was confirmed to have a layered structure portion and a spinel structure portion since the presence of peculiar peaks were recognized by X ray diffraction (XRD) at a layered structure and a spinel structure.

In addition, the lithium-containing transition metal oxide (B) extracted by disassembling the lithium ion secondary battery of each of the above-mentioned Examples was confirmed to have the spinel structure since the presence of a peculiar peak was recognized by X ray diffraction (XRD) at the spinel structure. Incidentally, the structures may be confirmed also by electron diffraction analysis, and the composition may be confirmed by inductively coupled plasma (ICP), for example.

Though the present invention has been explained with reference to some embodiments and Examples, the present invention is not limited to these and therefore modifications and variations are acceptable within the scope of the present invention.

More specifically, the above embodiments and Examples cited a laminate-type battery or a coin-type battery as examples of the lithium ion secondary battery; however, examples of the lithium ion secondary battery are not limited to these and therefore conventionally known configurations or structures such as a sheet-type battery, a button-type battery and a square or cylindrical can-type battery are also applicable.

Furthermore, the present invention can apply not only the above-mentioned laminated type (a flat type) battery but also conventionally known configurations and structures such as a wound-type (a cylindrical type) battery.

Furthermore, if considered from the viewpoint of an electrical connection state (an electrode structure) in the lithium ion secondary battery, the present invention can apply not only the above-mentioned normal type (an internal parallel connection type) battery but also conventionally known configurations and structures such as a bipolar type (an internal series connection type) battery. For reference sake, a battery element in the bipolar battery has a multilaminated structure of: a bipolar electrode wherein a negative electrode active material layer is formed on one surface of a collector and a positive electrode active material layer is formed on the other surface of the collector; and an electrolyte layer.

Though the above-mentioned embodiments and Examples have been explained by citing the lithium ion secondary battery as an example of an electrical device, the present invention is not limited to these and therefore applicable to a lithium ion capacitor and the like.

The invention claimed is:
1. A positive electrode active material comprising:
a solid solution lithium-containing transition metal oxide (A) comprising

$$Li_{1.5}[Ni_aCo_bMn_c[Li]_d]O_3 \qquad (1),$$

wherein in (1), Li is lithium, Ni is nickel, Co is cobalt, Mn is manganese and O represents oxygen, wherein a, b, c and d satisfy the relations of $0.25<a<0.44$, $0<b<0.44$, $0.37<c<1.1$, $0.15≤d≤0.25$, $a+b+c+d=1.5$, $1.25≤a+b+c≤1.35$, and $0<b/a<1$, and the solid solution lithium-containing transition metal oxide (A) comprises a spinel structure and a spinel structure change ratio of not smaller than 0.5 and smaller than 0.9; and
a lithium-containing transition metal oxide (B) comprising $$LiM_xMn_{2-x}O_4 \qquad (2),$$

wherein in (2), Li is lithium, Mn is manganese, O is oxygen, M represents Cr or Al, and x satisfies the relation of $0≤x<2$, and
wherein the solid solution lithium-containing transition metal oxide (A) and the lithium-containing transition metal oxide (B) satisfy the following relational expression (3)

$$0.50≤M_B/(M_A+M_B)<1.00 \qquad (3),$$

wherein in the expression (3), $M_A$ represents the mass of the solid solution lithium-containing transition metal oxide (A) and $M_B$ represents the mass of the lithium-containing transition metal oxide (B).

2. A positive electrode active material as claimed in claim 1, wherein the solid solution lithium-containing transition metal oxide (A) and the lithium-containing transition metal oxide (B) satisfy the following relational expression (4)

$$0.75≤M_B/(M_A+M_B)<1.00 \qquad (4),$$

wherein in the expression (4), $M_A$ represents the mass of the solid solution lithium-containing transition metal oxide (A) and $M_B$ represents the mass of the lithium-containing transition metal oxide (B).

3. A positive electrode active material as claimed in claim 1, wherein x satisfies the relation of 0<x<0.5.

4. A positive electrode active material as claimed in claim 1, wherein:
the solid solution lithium-containing transition metal oxide (A) has a BET specific surface area of not smaller than 0.8 m$^2$/g and not larger than 10.0 m$^2$/g; and
the solid solution lithium-containing transition metal oxide (A) has a 50% passing particle diameter of not more than 20 µm.

5. A positive electrode active material as claimed in claim 4, wherein:
the solid solution lithium-containing transition metal oxide (A) has a primary particle diameter of not smaller than 30 nm and not larger than 200 nm.

6. A positive electrode active material as claimed in claim 1, wherein:
the lithium-containing transition metal oxide (B) has a BET specific surface area of not smaller than 0.2 m$^2$/g and not larger than 3.0 m$^2$/g; and
the lithium-containing transition metal oxide (B) has a 50% passing particle diameter of not more than 20 µm.

7. A positive electrode for an electrical device, comprising:
a positive electrode active material as claimed in claim 1.

8. An electrical device comprising:
a positive electrode for an electrical device, as claimed in claim 7.

9. An electrical device as claimed in claim 8, wherein the electrical device is a lithium ion secondary battery.

10. A positive electrode active material as claimed in claim 1, wherein the solid solution lithium-containing transition metal oxide (A) further comprises a first layered structure portion and a second layered structure portion changeable into the spinel structure.

11. A positive electrode active material as claimed in claim 10, wherein the second layered structure portion changes into the spinel structure within an electric potential range of not less than 4.3V and not more than 4.8V.

* * * * *